United States Patent [19]

Fuse et al.

[11] 3,830,958

[45] Aug. 20, 1974

[54] IMAGE ENHANCEMENT APPARATUS UTILIZING VARIABLE VELOCITY SCAN

[75] Inventors: Yuzo Fuse; Seisuke Yamanaka; Tsunenari Saito, all of Tokyo, Japan

[73] Assignee: Sony Corporation, Tokyo, Japan

[22] Filed: Mar. 19, 1973

[21] Appl. No.: 342,453

[30] Foreign Application Priority Data

Mar. 23, 1972 Japan .................... 47-29260
Mar. 23, 1972 Japan .................... 47-29263

[52] U.S. Cl. ............ 178/5.4 R, 178/7.5 R, 178/7.7, 178/DIG. 25, 178/DIG. 34

[51] Int. Cl. .................... H04n 9/16

[58] Field of Search ....... 178/7.3 R, 7.5 R, DIG. 25, 178/DIG. 34, 7.7, 5.4 R; 315/22

[56] References Cited

UNITED STATES PATENTS 2,227,630 1/1941 Carnahan .................... 178/7.7 X
3,479,453 11/1969 Townsend .................... 178/6.8 X
3,752,916 8/1973 Lowry et al. .................... 178/DIG. 34

*Primary Examiner*—Robert L. Richardson
*Attorney, Agent, or Firm*—Lewis H. Eslinger, Esq.; Alvin Sinderbrand, Esq.

[57] ABSTRACT

An electron beam tube with internal deflection plates to modulate the scanning velocity of an electron beam in response to a control signal. The control signal is produced in response to at least transient parts included in a video signal and supplied to the beam deflection means through condenser means fabricated by conductive films coated on the inner and outer surfaces of a neck portion of the tube.

2 Claims, 9 Drawing Figures

IMAGE ENHANCEMENT APPARATUS UTILIZING VARIABLE VELOCITY SCAN

BACKGROUND OF THE INVENTION

1. Field of the Invention

This invention relates to an image reproducing device comprising a cathode ray tube and particularly to condenser connection means to connect signals through the wall of the tube to internal deflection plates to modulate the scanning velocity of the beam for reproducing a picture image having significantly improved sharpness.

2. Description of the Prior Art

When the phosphor screen of an image reproducing device such as a cathode ray tube of a television receiver is scanned by an electron beam so as to form a picture image on the phosphor screen, the electron beam forms on the phosphor screen a beam spot whose size is larger at high brightness levels than the spot formed by the electron beam corresponding to the low brightness level portions of the image. As a result, the apparent response of the picture image becomes degraded at portions of the image where a sudden change of the brightness level occurs.

As means of compensating for such degradation of the apparent response of the picture image, an aperture compensation technique has been proposed and is described, for example, in R. C. Dennison, "Aperture Compensation for Television Camera," RCA Review, 14,569 (1953). In that aperture compensation technique, however, the intensity of the electron beam is increased at those portions of the picture image at which the brightness changes from a lower level to a higher level. As a result, the size of the beam spot formed by the electron beam is also enlarged at those same portions. This conventional technique has the disadvantage that the apparent response of the picture image cannot be sufficiently compensated for.

In order to avoid that disadvantge of the aperture compensation technique, it has been proposed to detect transient changes in the brightness level of the picture image and change the electron beam scanning velocity from its normal velocity in response to the signal thus detected. Such a velocity modulation technique has been described, for example, in U.S. Pat. No. 2,678,964.

However, troubles arise from the means used to modulate the electron beam scanning velocity from its normal velocity. In U.S. Pat. No. 2,678,964 it has been proposed to supply a control signal to a separate deflection coil wound around the neck portion of a cathode ray tube. The same patent also proposed to use a beam-deflection electrode arranged in the neck portion of the cathode ray tube and having a lead-in wire directly through the neck portion from the outside. One disadvantage of using an additional deflection coil is that it is difficult to change the electron beam scanning velocity within a short period of time because of the inductance and capacitance inherent to the coil. The use of deflection plates has the disadvantage that a high voltage must be applied to the lead-in wire for the purpose of biasing the beam-deflection electrode by the high voltage. This is very dangerous and makes it difficult to insulte the field and line-scanning coils fitted on the neck of the cathode ray tube.

One object of this invention is to provide an improved image reproducing device.

Another object of the invention is to provide an improved device which is capable of modulating the scanning velocity within a short period of time and without applying to the device a high voltage control signal.

Another object is to provide an improved circuit for producing a scanning control signal.

A further object is to provide Trinitron (trademark) tube having beam-subdeflection means.

Still another object of the invention is to provide an improved velocity modulation device which is simple in construction, small in size and applicable to a Trinitron (trademark) multi-beam cathode ray tube device comprising a common main electron lens.

SUMMARY OF THE INVENTION

In accordance with this invention, a video signal including at least transient components is supplied to a circuit means for producing a control signal in response to the transient components. The control signal is supplied through condenser means fabricated by conductive films coated on the inner and outer surfaces of a neck portion of an electron beam tube to beam deflection means within the tube.

DESCRIPTION OF THE PREFERRED EMBODIMENTS

Figure 1:
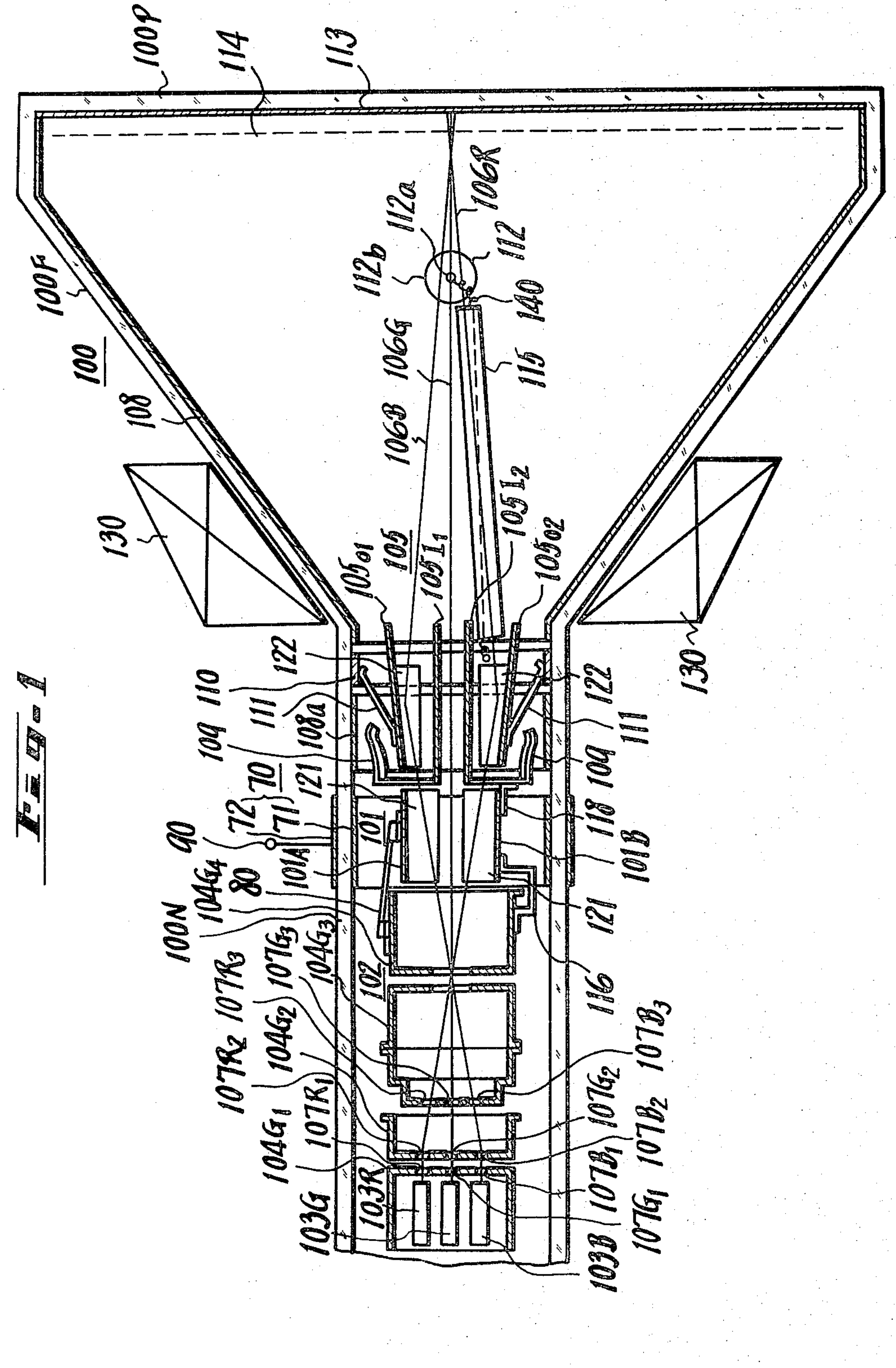
FIG. 1 is a cross-sectional view through the tube along the axis of one embodiment of a single electron gun, multi-beam type cathode ray tube according to the invention.
Figure 2:
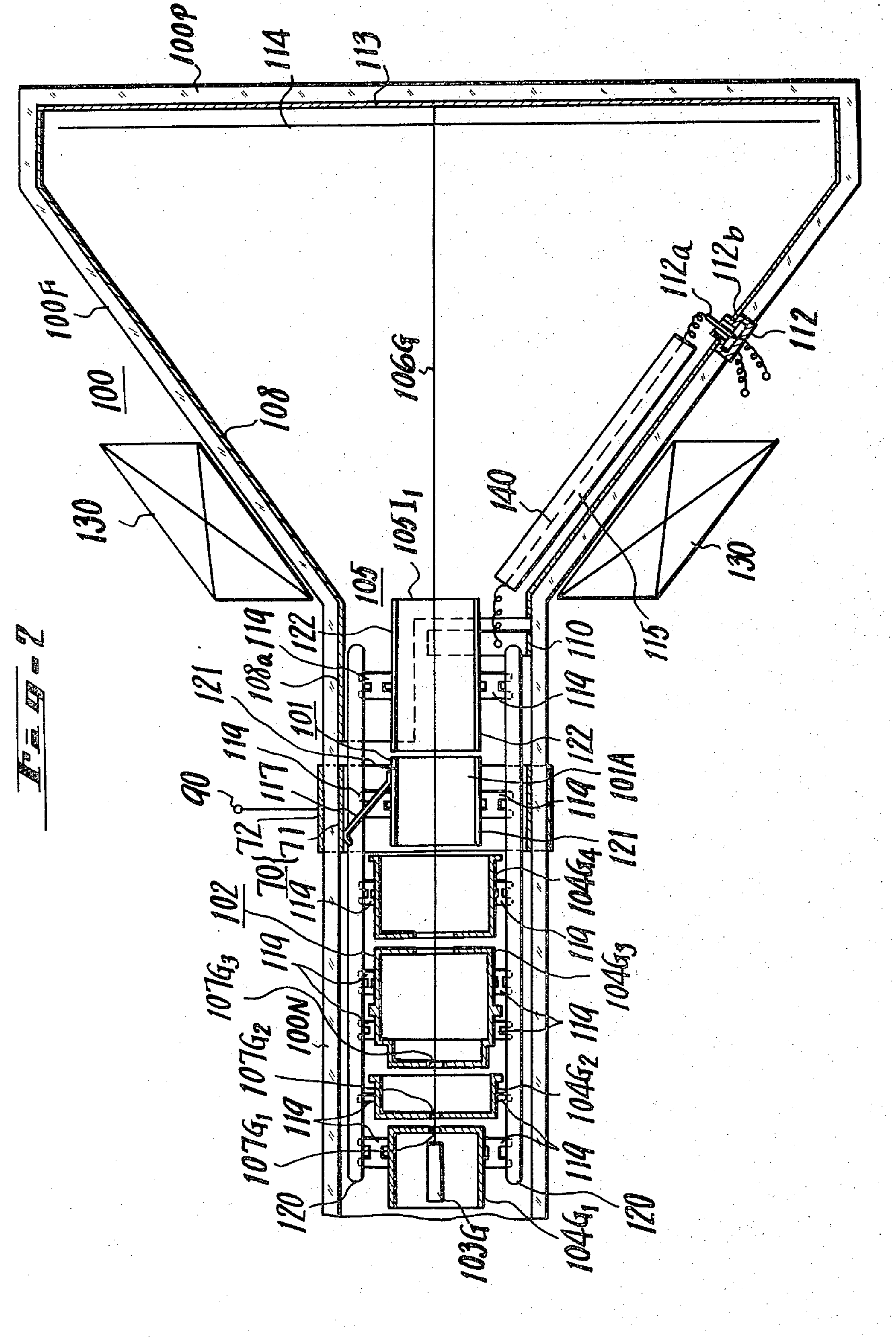
FIG. 2 is a cross-sectional view of the cathode ray tube shown in FIG. 1 and along the axis of the tube but in a plane perpendicular to the cross-sectional view in FIG. 1.

In FIGS. 1 and 2, a cathode ray tube 100 has an envelope that consists of a panel portion 100P, a funnel portion 100F and a neck portion 100N. The panel portion 100P has a color phosphor screen 113 coated on its inner surface. In juxtaposition to the screen 113 is a color selective electrode, for example, an aperture grill 114. A single electron gun, or beam generating means, 102 for generating an electron beam is located in the neck 100N.

The electron gun 102 has three cathodes 103R, 103G, 103B so designated because their electron beams strike red, green and blue phosphor areas, respectively, of the color phosphor screen 113. The three cathodes all lie in a common plane, and are, therefore, referred to as being in line. A first grid $104G_1$, a second grid $104G_2$, a third grid $104G_3$ and a fourth grid $104G_4$ common to all of beams from the cathodes are arranged in succession along a common axis. At the rear of the fourth grid $104G_4$ is a converging deflection means 105 that consists of two parallel inner deflection electrodes $105I_1$ and $105I_2$, which are arranged symmetrically with respect to the tube axis perpendicular to the screen 113, and two parallel outer deflection electrodes $105O_1$ and $105O_2$, which are also arranged symmetrically with respect to the axis and outside the inner electrodes.

Between the fourth grid $104G_4$ and the converging deflection means 105 is a beam-subdeflection electrode 101 to modulate, or modify, the scanning velocity of the electron beam from the normal constant scanning velocity. The beam-subdeflection electrode 101 consists of two parallel deflection electrodes 101A and 101B arranged symmetrically with respect to the tube axis. The distance between the electrode 101A and the electrode 101B may be greater at the end toward the panel portion 100P than at the end toward the cathodes 103R, 103G, and 103B.

The first grid $104G_1$, the second grid $104G_2$ and the third grid $104G_3$ are provided with apertures $107R_1$, $107G_1$, $107B_1$, $107R_2$, $107G_2$, $107B_2$, and $107R_3$, $107G_3$, $107B_3$, respectively, through which pass electron beams 106R, 106G and 106B that strike the red, green and blue phosphor areas of the screen 113. The electrons that make up these beams are emitted from the cathode 103R, 103G and 103B, respectively.

The second and third grids $104G_2$ and $104G_3$ define a prefocusing electron lens common to all of the electron beams 106R, 106G and 106B. The third and fourth grids $104G_3$ and $104_4$ define a main electron lens common to all of the electron beams 106R, 106G and 106B. The prefocusing lens causes the electron beams 106R, 106G and 106B to cross substantially in the region of the main electron lens and to diverge therefrom along paths such that the center electron beam 106G passes between the inner electrode plates $105I_1$ and $105I_2$ of the converging deflection means 105 and that the side electron beams 106R and 106B pass between the opposite inner and outer electrode plates $105I_2$ and $105O_2$ and between the opposite inner and outer electrode plates $105I_1$ and $105O_1$, respectively. Conductive resilient contact pieces 109 are secured to the inside electrode plates $105I_1$ and $105I_2$ of the converging deflection means 105 in such a way that the free end of each piece 109 makes resilient contact with an extension 108*a* of a conductive film 108 coated on the inner surface of the funnel portion 100F. The film 108 extends to the inner surface of the neck portion 100N and is coated thereon, thereby electrically connecting to the inner electrode plate $105I_1$ and $105I_2$ of the converging deflection means 105. The converging deflection means 105 in the neck portion 100N is provided with a C-shaped conductive leaf spring 110 which is resiliently clamped around the outside of the converging deflection means 105. To the outer electrode plates $105O_1$ and $105O_2$ of the converging deflection means 105 are secured conductive resilient contact pieces 111 having free ends that make resilient contact with the C-shaped conductive leaf spring 110, thereby electrically connecting the C-shaped conductive leaf spring 110 to the conductive resilient contact piece 111. A coaxial anode button 112 is sealed into the wall of the funnel portion 100F. The button 112 includes an inner conductor 112a to which a converging voltage is applied. The C-shaped conductive leaf spring 110 is connected by a conductor 140 to the inner conductor 112*a*. The conductor 140 extends through an insulator tube 115 so as to prevent an electrical short circuit between the conductor 140 and the conductive film 108. The outer conductor 112*b* of the button 112 is connected to the conductive film 108 to connect anode voltage to this film.

The fourth grid $104G_4$ is electrically connected by a conductor 116 to the deflecting plate 101B of the beam-subdeflection electrode structure 101. The deflecting plate 101B is also electrically connected by a conductor 118 to the inside electrode plate $105I_2$ of the converging deflection means 105. The anode voltage is applied through the outer conductor 112b of the anode button 112, the extension 108*a*, and the resilient contact piece 109 to the inner electrode plates $105I_1$ and $105I_2$ of the converging deflection means 105. The anode voltage is also applied through the conductor 118 to the deflecting plate 101B of the beam-subdeflection electrode 101 and through the conductor 116 to the fourth grid $104G_4$. The converging voltage is applied through the inner conductor 112a, the conductor 140, the C-shaped spring 110, and the contact piece 111 to the outer electrode plates $105O_1$ and $105O_2$.

Thus, the electron beam 106B incident between the inner electrode plate $105I_1$ and the outer electrode plate $105O_1$ of the converging deflection means 105, and the electron beam 106R incident between the inner electrode plate $105I_2$ and the outer electrode plate $105O_2$ converge with the center beam 106G at the screen 113.

The first, second, third and fourth grids $104G_1$, $104G_2$, $104G_3$ and $104G_4$, the deflecting plates 101A and 101B of the deflection means 101 for modulating the scanning velocity, and the inner and outer plates $105I_1$, $105I_2$, $105O_1$, $105O_2$ of the converging deflection means 105 are mechanically connected through pins 119 to a pair of beading glass rods 120, respectively, and held at a given position relative to each other. An integral side plate 121 extends perpendicularly to each side of the deflecting plates 101A and 101B of the deflecting means 101. These side plates 121 are connected through the pins 119 to the pair of beading glass rods 120. An integral side plate 122 extends perpendicularly to each side of the electrode plates $105I_1$, $105I_2$, $105O_1$, $105O_2$ of the converging deflection means 105. These side plates 122 are connected through the pins 119 to the pair of beading glass rods 120. Both of the side plates 121 and 122 serve to preventing the disturbance of the electric field in the sub-deflecting means 101 and the converging means 105.

A deflection yoke 130 includes coils which cause the beams 106R, 106G and 106B to scan the screen 113 vertically and horizontally.

The outer surface of one of the deflecting plates of the deflection means 101 for modulating the scanning velocity, for example the deflecting plate 101A, and the outer surface of the fourth grid $104G_4$ are joined by a resistance means 80. The resistance means 80 is made by painting a resistance coating on an insulating substrate made of a ceramic etc. and provided at each end with an electrode. The projected ends of these electrodes are electrically and mechanically connected by welding to given parts of the fourth grid $104G_4$, and the deflecting plate 101A of the deflection means 101.

In accordance with the invention, a conductive film 71 is coated over a desired annular area of the inner wall of the neck portion 100N near the deflection means 101 to form a first capacitor electrode and a conductive film 72 is coated on the opposite outer periphery of the neck portion 100N to form the other electrode of the capacitor. The conductive film 72 is connected to a terminal 90.

The electrode 70 is connected to the deflecting plate 101A of the deflection means 101 by a resilient contact 117, one end of which is secured to the plate 101A, and the end of which makes resilient contact with the electrode 71.

Figure 3:
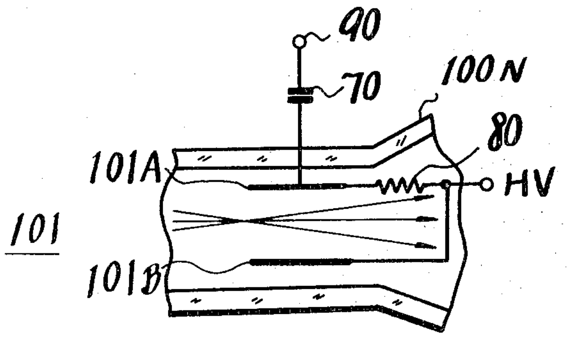
FIG. 3 shows a schematic circuit for supplying a control signal through a condenser to electron beam deflection means of the type shown in FIGS. 1 and 2.

FIG. 3 shows an equivalent circuit of means for supplying a control signal to the deflection means constructed and arranged as above described. Between the terminal 90 and one of the deflecting plates 101A is connected the condenser means 70 fabricated by the conductive films 71 and 72. The resistance means 80 is connected in series between the deflecing plates 101A and 101B, and the high anode voltage is connected to the plate 101B. As a result, the high DC anode voltage HV applied to the anode button 112 cannot pass through the condenser means 70 so that the outer conductive film 72, and hence the terminal 90, is not subjected to the high voltage, thus insuring safe handling. The capacitance of the condenser means 70 may be chosen, for example, to be on the order of 50 PF and the resistance value of the resistance means 80 may be chosen, for example, to be on the order of 100 KΩ. A signal for modulating the scanning velocity of the electron beam in response to the change in level of the video signal is applied to the terminal 90.

Figure 4:
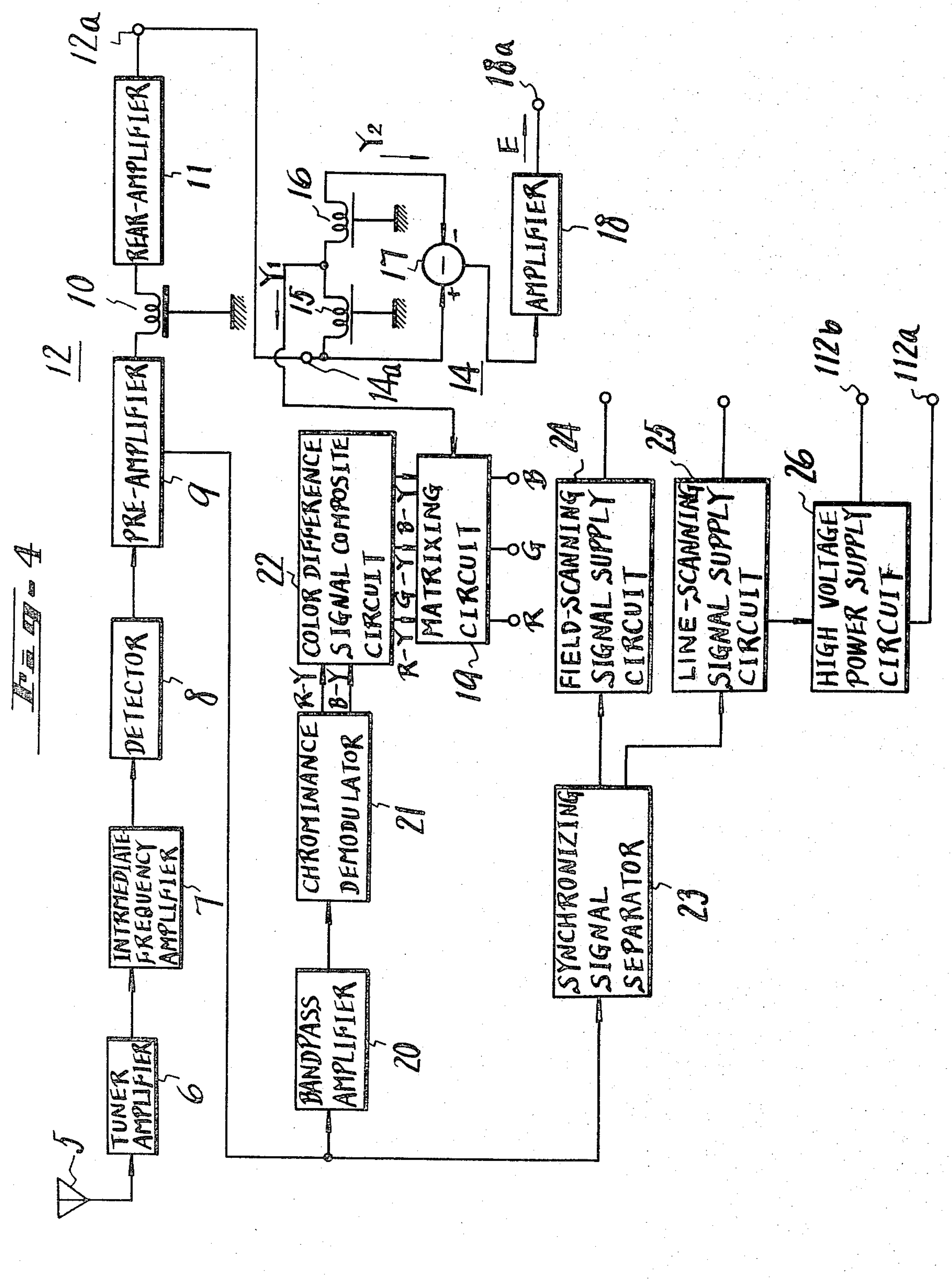
FIG. 4 is a block diagram of a circuit for producing a control signal in response to at least transient components included in a video signal.

FIG. 4 shows circuit means for producing the control signal in response to at least transient components included in a video signal. The video signal, for example, a color television signal, received by an antenna 5 passes through a tuner amplifier 6 and intermediate frequency amplifier 7 to a detector 8. The detected output then goes to a video amplifier circuit 12 consisting of a pre-amplifier 9, a delay line 10 and a rear-amplifier 11 to derive a brightness or luminance signal $Y_O$ from an output terminal 12*a* of a video amplifier circuit 12.

The brightness signal $Y_O$ is supplied to an input terminal 14*a* of a circuit means 14 for producing a control signal in response to transient components included in the video signal. The circuit means 14 shown consists of two delay lines 15 and 16, each of which delays signals by a time $\tau$, and a subtractor 17. The brightness signal $Y_O$ derived from the rear-amplifier 11 of the circuit 12 is delayed by the time $\tau$ by means of the delay line 15 to obtain a signal $Y_1$ which is further delayed by the same additional length of time $\tau$ by means of the delay line 16 to obtain a signal $Y_2$. The signal $Y_2$ delayed by the time $2\tau$ with respect to the brightness signal $Y_O$ is applied to the subtractor 17 to obtain a control signal E for modulating the scanning velocity.

Figures 5, 6:
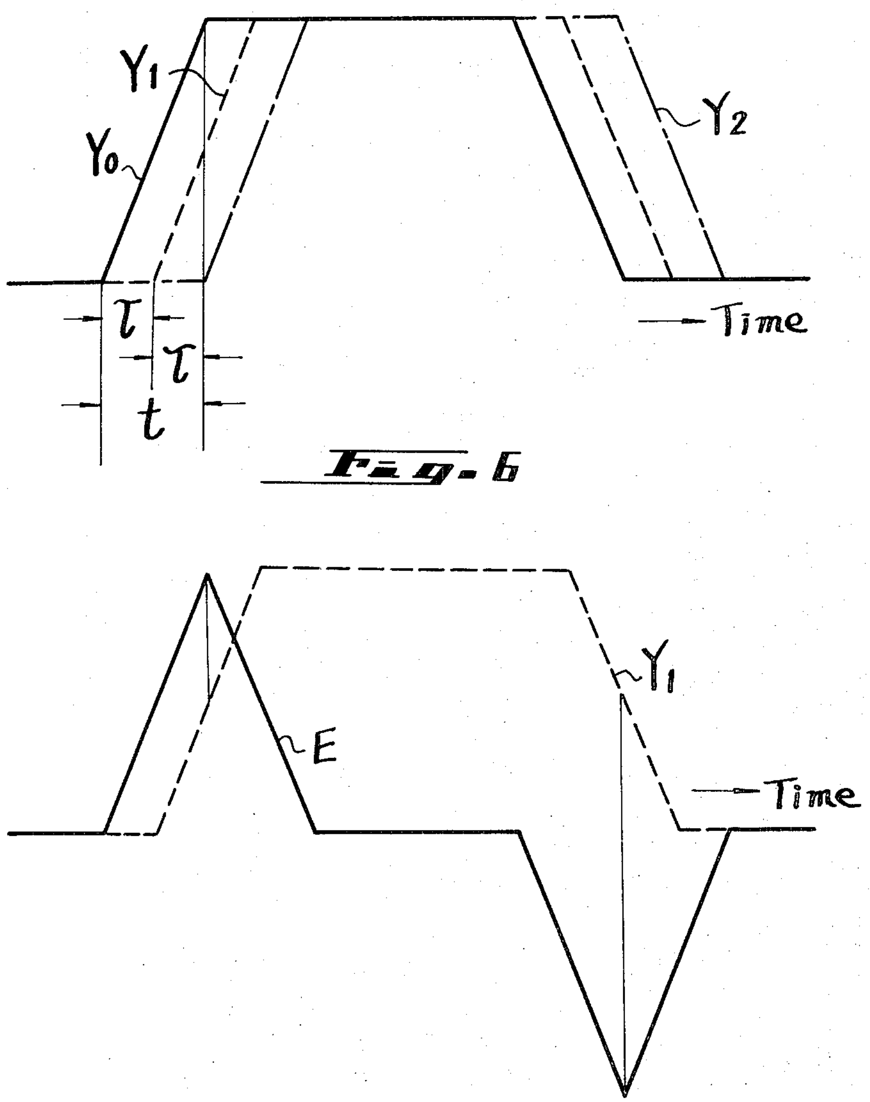
FIGS. 5 and 6 graphically represent relations between changes in intensity of a control signal E and a density modulating signal $Y_1$.

The sharpness of images produced by a cathode ray tube is of most importance when the brightness signal $Y_O$ changes from the black level to the white level or from the white level to the black level, which is the largest possible level change and is shown in FIG. 5. If the rise time and the fall time of the brightness signal $Y_O$ are given by $t$, the time $\tau$ delayed by the delay lines 15 and 16 is chosen to be one half of $t$. Experimental tests have yielded the result that $t$ is on the order of 0.2 $\mu$ sec. Thus, the delaying time $\tau$ may be chosen, for example, to be 0.1 $\mu$sec. Of course, the delay time $\tau$ may be varied so as to adjust it to a suitable value. The control signal E for modulating the scanning velocity becomes a positive pulse at the time that the signal $Y_O$ rises up and becomes a negative pulse at the time that the signal $Y_O$ lowers down, as shown in FIG. 6. This control signal E is suppleid through an amplifier 18 to an output terminal 18*a*. The gain of amplifier 18 may be varied to adjust the level of the signal E.

The signal $Y_1$ delayed the time $\tau$ from the signal $Y_O$ is supplied as a brigtness signal to the cathode ray tube. As is shown in FIG. 6 the peak of the control signal E is coincident in time with the intermediate point of the leading edge or trailing edge of the brightness signal $Y_1$ supplied to the cathode ray tube. In order to supply the signal $Y_1$ as the brightness signal to the cathode ray tube, the amount of delay of the delay line 10 is chosen such that the signal $Y_1$ is coincident in time with the color signal produced in a matrixing circuit 19. The brightness signal $Y_1$ is supplied to the matrixing circuit 19.

The video signal obtained from the pre-amplifier 9 of the circuit 12 is supplied to a band-pass amplifier 20 from which is derived a chrominance signal which is then supplied to a chrominance demodulator 21 to obtain two demodulated color signals R-Y and B-Y, for example. These color signals R-Y and B-Y are supplied to a color difference signal composite circuit 22 to obtain three color difference signals R-Y, G-Y and B-Y which are then supplied to the matrixing circuit 19 to obtain individual red color signals R, green color signals G and blue color signals B.

The video signal obtained from the pre-amplifier 9 of the circuit is also supplied to a synchronizing signal separator 23 to obtain line- and field-synchronizing signals. The field-synchronizing signal is supplied to a field-scanning signal supply circuit 24 to obtain a field-scanning signal, and the line-synchronizing signal is supplied to a line-scanning signal supply circuit 25 to obtain a line-scanning signal which is also supplied to a high voltage power supply circuit 26 to obtain the anode voltage and convergence voltage at the terminals 112*b* and 112*a*.

The color signals, R, G and B obtained from the circuit 19 are supplied to the cathodes 103R, 103G and 103B of the cathode ray tube 100 described with reference to FIGS. 1 and 2.

The control signal E, which may have an amplitude on the order of 100v., is obtained from the output terminal 18*a* of the amplifier 18 and is supplied to the terminal 90 shown in FIGS. 1, 2 and 3. The condenser 70 connects the control signal E, which is an alternating voltage, to the plate 101A but the signal E is prevented from reaching the other deflecting plate 101B because the high resistance of the resistor 80 is effectively connected to ground for high frequencies by the high voltage supply. On the other hand, since no direct current can flow through the resistor 80, both plates 101A and 101B are the same high voltage level. The capacitor 70 isolates the terminal 90 from the high anode direct voltage which may be on the order of 20 KV, supplied to the two deflecting plates 101A and 101B, even though both of these deflecting plates are at the same high direct voltage.

The terminals **112*b* and 112*a* of the high voltage power supply circuit 26 from which the anode voltage and the convergence voltage are obtained are the same as the outer conductor 112*b* and the inner conductor 112*a* of the anode button 112 of the cathode ray tube 100**, respectively.

The cathode ray tube 100 constructed as described makes it possible to density modulate each electron beam by the delayed brightness signal $Y_1$, deflect each electron beam by the field and line scanning yoke 130, and slightly deflect each electron beam by the control signal E supplied across the deflecting plates 101A and 101B. The micro-deflection effected by the control signal E causes a modulation of the scanning velocity of the electron beam on the screen 113 at times when the signal $Y_1$ either rises or falls. That is, the scanning velocity becomes higher immediately before the signal $Y_1$ is rising, and returns to its normal velocity after the signal $Y_1$ has completely risen. The scanning velocity becomes lower immediately before the signal $Y_1$ falls and restores to its normal velocity after the signal $Y_1$ has completely fallen.

If the electron beam scanning velocity were not modulated by the signal E, the amount of liqht emitted from that portion of the screen 113 which corresponds to the signal $Y_1$ would be relatively slowly changed. On the contrary, if the electron beam scanning velocity is modulated by the control signal E according to the invention, the amount of light emitted from that portion of the screen 113 at which the scanning velocity becomes higher is reduced, while the amount of light emitted from that portion of the screen 113 at which the scanning velocity becomes lower is increased. That is, if the electron beam scanning velocity is modulated by the control signal E, the amount of light emitted from those portions of the screen 113 at which the signal $Y_1$ rises and falls is suddenly changed, thereby improving the sharpness of images produced by the cathode ray tube 100.

Figure 7:
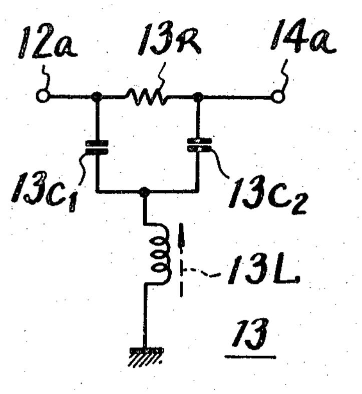
FIG. 7 is a circuit diagram of a trap circuit for producing the density modulating signal $Y_1$.

The video signal $Y_0$ obtained from the output terminal 12a in FIG. 4 of the video amplifier circuit 12 may be differentiated and the signal thus differentiated may also be used as the control signal for modulating the scanning velocity. In this case, it is preferable to bring the time at which the differentiated signal takes its peak value into coincidence with the time intermediate the operation during which the delayed brightness signal $Y_1$ rises or falls. If the video signal is a composite color video signal mainly consisting of a brightness signal component and a color difference signal component, the latter being in the form of a sub-carrier of 3.58MHz modulated by the color difference signal component, the video signal $Y_0$ obtained from the output terminal **12*a* of the video amplifier circuit 12 may be supplied to a trap circuit 13 connected between the output terminal 12*a* and the input terminal 14*a* of the circuit means 14 for producing the control signal E shown in FIG. 4. The trap circuit 13 shown in FIG. 7 consists of a resistor 13R connected in series between the terminals 12*a* and 14*a*, two condensers 13C₁ and 13C₂ connected in series with each other and in parallel with the resistor 13R, and a variable inductance coil 13L connected between the connection point common to both of the condensers $13C_1$ and $13C_2$ and ground. The trap circuit 13 serves to substantially remove the color difference signal component from the composite color video signal, leaving only the brightness signal $Y_1$. The brightness signal $Y_1$ may then be supplied to the circuit means 14 shown in FIG. 4 for producing the control signal. The variable inductance coil 13L of the trap circuit 13 plays a role of bringing the value of the trapping frequency of the trap circuit 13** into coincidence with the sub-carrier.

In supplying the control signal E to the deflection means 101, the positive pulse of the control signal E which is obtained at the rising part of the signal $Y_1$ may be supplied through a condenser to one deflecting plate 101A, and the negative pulse of the signal E which is obtained at the lowering down part of the signal $Y_1$ may be supplied through another condenser to the other deflecting plate 101B. The high voltage at the terminal 112 may also be supplied through two high resistance means to the deflecting plates 101A and 101B, respectively, thereby maintaining a good balance between the high voltages supplied to the deflecting plates 101A and 101B, respectively. In such cases, both condenser means may be fabricated on the outer and inner walls of the neck portion of the cathode ray tube and both resistance means may be arranged in the neck portion as described with reference to FIGS. 1, 2 and 3.

As shown in FIGS. 1 and 2, the invention is embodied in a Triniton (trademark) tube of a type in which the main focusing electron lens is an electrostatic lens type customarily referred to as a bipotential lens. The field of this lens is primarily determined by the third grid 104G₃ and the fourth grid 104G₄. In the present embodiment, the fourth grid can be shortened, and the deflection means 101 for modulating the scanning velocity may be located between the shortened fourth grid and the convergence deflection means. As a result the axial length of the electron gun as a whole need not be increased in order to provide space for the deflection means 101.

The invention, may also be applied to a Triniton (trademark) multi-beam cathode ray tube of the type that has a unipotential main focussing lens consisting of a first anode (third grid), a collector electrode (fourth grid), and a second anode (fifth grid). In such a tube, the deflection means for modulating the scanning velocity may be arranged between the second anode and the convergence deflection means.

The cathode ray tube 100, for example, the multi-beam cathode ray tube constructed as above described can improve the sharpness of picture image. More particularly the deflection means 101 arranged at the rear of the main focusing lens makes it possible to reduce the strain produced in the beam spot. That is, the deflection means 101 arranged at the rear of the electrodes that define the main focusing lens is capable of producing a uniform deflecting electric field and hence making the sensitivity of both electron beams 106R and 106B, which are not so far separated from the center axis of the deflecting electric field, substantially uniform. Such an arrangement is also capable of making the aberration of the deflecting electric field small, thereby obtaining at the screen 113 beam spots having substantially no strain.

If the deflection means is arranged in front of or within the main focusing lens, it will cause the electron beam to deflect from the center axis and hence cause it to be incident upon the electrodes that define the main focusing lens, and as a result, the aberration of the deflecting electric field becomes large or the deflection means 101 for modulating the scanning velocity greatly influences the main focusing lens field. Such disadvantages can be obviated by locating the deflection means 101 at the rear of the main focusing lens.

More particularly, in accordance with the invention the condenser means 70 is fabricated with the aid of the outer and inner walls of the neck portion of the cathode ray tube. Thus, the cathode ray tube according to the invention has advantages that a separate condenser means is not required thus reducing the number of parts, that the condenser means can easily be assembled, that the utility of space can be improved, and that a terminal to which the control signal is supplied can easily be led out of the condenser means.

Figure 9:
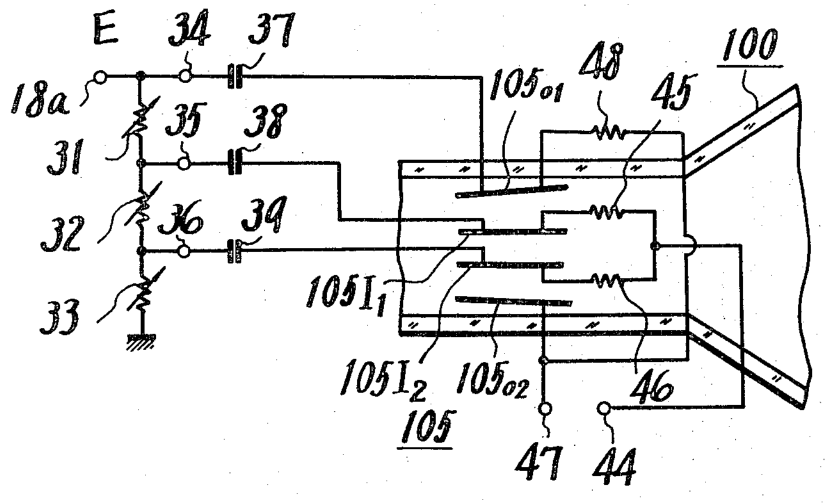
FIG. 9 is a schematic diagram of an equivalent circuit for supplying to electron beam deflection means shown in FIG. 8 control signals having voltage levels that are different in succession.
Figure 8:
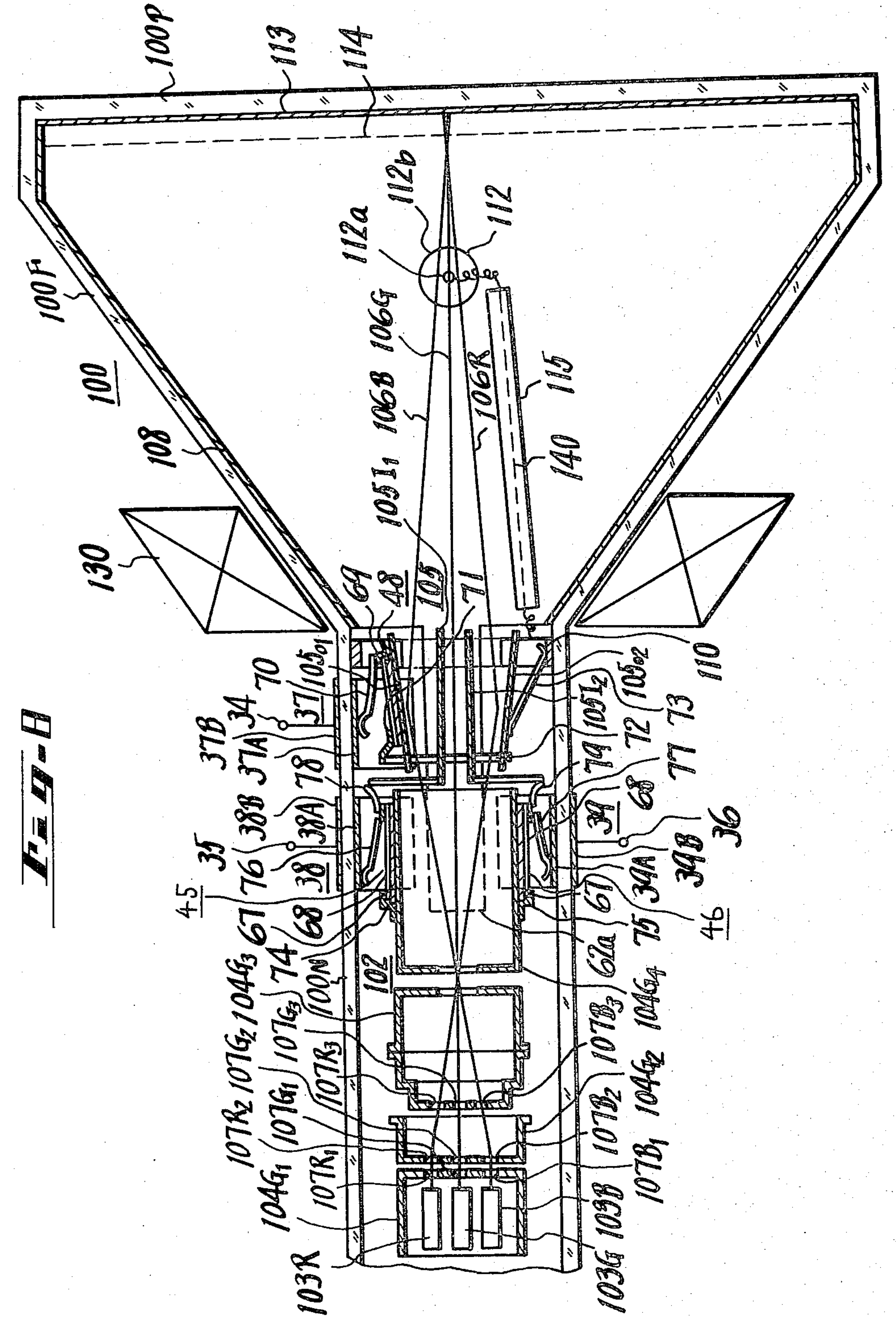
FIG. 8 is a cross-sectional view along the axis of another embodiment of the single electron gun, multi-beam type cathode ray tube according to the invention.

FIGS. 8 and 9 show another embodiment of the invention. In this embodiment, the outer convergence deflection plates $105O_1$ and $105O_2$ are not directly connected together nor are the inner deflection plates $105I_1$ and $105I_2$ directly connected together. As a result, both the convergence deflection voltage and the signal for modulating the scanning velocity can be applied to one deflection structure 105.

In FIG. 9, the reference numeral 18*a* designates the output terminal of the amplifier 18 shown in FIG. 4, the control signal E being derived from the terminal 18*a*. The terminal 18*a* is connected to one end of a voltage divider comprising three resistors, such as variable resistors 31, 32 and 33. One end of the resistor 31 is connected to an output terminal 34, the common connection point between the resistor 31 and the resistor 32 is connected to an output terminal 35, the common connection point between the resistor 32 and the resistor 33 is connected to an output terminal 36, and the other end of the resistor 33 is connected to ground. From these output terminals 34, 35 and 36 are obtained signals whose voltages are divided in succession. The resistance value of each of these resistors 31, 32 and 33 may be variable to adjust the voltage dividing ratio among these resistors. The output terminal 34 is connected through a condenser means 37 to one of the outer deflecting plates $105O_1$ of the converging deflection means 105 of the cathode ray tube 100, and the output terminal 35 is connected through a condenser means 38 to the inner deflecting plate $105I_1$ adjacent to the deflecting plate $105O_1$ of the converging deflection means 105.

The output terminal 36 is connected through the condenser means 39 to the other inner deflecting plate $105I_2$. The anode voltage terminal 44 is connected through the high resistance means 45 and 46 to the inner deflecting plates $105I_1$ and $105I_2$. A convergence voltage terminal 47 is connected through resistance means 48 having a high resistance value to one of the outer deflecting plates $105O_1$ and is connected directly to the other outside deflecting plate $105O_2$. These deflecting plates $105O_1$, $105I_1$ and $105I_2$ are isolated from each other by the resistance means 45, 46 and 48, which impede the flow of alternating current. As a result, relatively low voltage alternating current control signals derived from the terminals 34, 35 and 36 and having successively different voltage levels can easily be supplied to the deflecting plates $105O_1$, $105I_1$ and $105I_2$ to which are supplied the high direct voltages through the terminals 112a and 112b connected to the terminals 47 and 44, respectively.

Each of the condenser means 37, 28 and 39 is fabricated by applying electrodes to the inner and outer walls of the neck portion 100N of the cathode ray tube 100 and all of the resistance means 45, 46 and 48 are arranged in the neck portion 100N as shown in FIG. 8. In the description of this figure, those parts common to the tube shown in FIGS. 1 and 2 will not be described again. The condenser means 37 is fabricated by coating conductive films 37A and 37B on desired semi-annular areas of the inner and outer walls of the neck portion 100N near the convergence means 105, the terminal 34 being connected to the conductive film 37B. The condenser 38 is fabricated by coating conductive films 38A and 38B on desired semi-annular areas of the inner and outer walls of the neck portion 100N near the fourth grid $104G_4$, the terminal 35 being connected to the conductive film 38B. The condenser 39 is fabricated by coating conductive films 39A and 39B on desired semi-annular areas of the inner and outer walls of the neck portion 100N, the condenser 39 being positioned in opposition to the condenser 38 and the terminal 36 being connected to the conductive film 39B.

Each resistance means 45 and 46 is constituted by a resistance paint 68 coated on an insulating substrate 67 made of ceramics etc. and arranged on the fourth grid $104G_4$. A similar resistance means 48 is arranged on the deflecting plate $105O_1$ of the converging deflection means 105.

The resistance means 48 is provided at its one end with an electrode 69 welded to the deflecting plate $105O_1$. To the electrode 69 is secured one end of a conductive resilient contact piece 70, the free end of which is in contact with the conductive film 37A of the condenser means 37. The other end of the resistance means 48 is connected through a connecting wire 71 and connecting bar 72 to the deflecting plate $105O_2$. To the deflecting plate $105O_2$ is secured one end of a conductive resilient contact piece 73 which has a free end in contact with the C-shaped leaf spring 110. The spring 110, in turn, is connected through the conductor 140 to the core conductor 112*a* of the anode button 112.

The convergence voltage supplied to the leaf spring 73 is directly applied to the deflecting plate $105O_2$ and is applied through the resistance means 48 to the deflecting plate $105O_1$. The signal obtained at the terminal 34 is applied through the condenser means 37 to the deflecting plate $105O_1$. The resistance means 45 and 46 are provided at their ends with electrodes 74 and 75 welded to the fourth grid $104G_4$, respectively, and provided at their opposite ends with conductive resisient contact pieces 76 and 77 secured at their ends to the resistance means 45 and 46, respectively, the free ends of these pieces 76 and 77 being in contact with the conductive films 38A and 39A of the condenser means 38 and 39, respectively. The other ends of the resistance means 45 and 46 are connected through connecting wires 78 and 79 to the deflecting plates $105I_1$ and $105I_2$, respectively. The fourth grid $104G_4$ is connected to an extension 108*a* of the inside conductive film 108. Thus, the anode voltage is supplied from the outside conductor 112b of the anode button 112 through the inside conductive film 108, fourth grid $104G_4$, resistance means 45 and 46 to the deflecting plates $105I_1$ and $105I_2$. The voltages obtained at the terminals 35 and 36 are supplied through the condenser means 38 and 39 to the deflecting parts $105I_1$ and $105I_2$, respectively. The capacity of the condensers 37, 38 and 39 is on the order of 50 PF and the resistance value of the resistance means 45, 46 and 48 is on the order of 100 K.

As stated hereinbefore with reference to FIG. 9, the control signals for modulating the scanning velocity and having different voltage levels in succession are supplied to the convergence deflecing plates $105O_1$, $105I_1$ and $105I_2$, respectively. As a result, it is possible to horizontally deflect each electron beam 106R, 106G and 106B in a manner such that the beams 106R and 106B converge toward the center beam 106G on the screen 113 independently of the deflection by the field and line scanning coil 130.

In the above described example, the voltage division of the control signal E for modulating the scanning velocity obtained at the terminal 18a is effected by the resistors 31, 32 and 33. Such voltage division may also be effected with the aid of capacities formed between adjacent deflecing plates of the converging deflection means 105. In this case, it is sufficient to supply the control signal E obtained at the terminal 18*a* through the condenser 37 to the deflecting plate $105O_1$ only, and as a result, the resistors 31, 32 and 33 shown in FIG. 9 can be omitted. The signal supplied to the deflecting plate $105O_1$ is divided in voltage by means of capacity $C_1$ formed between the deflecting plates $105O_1$ and $105I_1$, capacity $C_2$ formed between the deflecting plates $105I_1$ and $105I_2$, and capacity $C_3$ formed between the deflecting plates $105I_2$ and $105O_2$, thereby supplying control signals whose voltage levels are different in succession to the deflecting plates $105O_1$, $105I_1$ and $105I_2$, respectively.

The above described cathode ray tube permits each electron beam to be density modulated by three prime signals composed of the delayed brightness signal $Y_1$ and each color difference signal. In addition, the control signals E for modulating the scanning velocity having different voltage levels in succession are supplied to the deflecting plates $105O_1$, $105I_1$ and $105I_2$. Thus, each electron beam is deflected by means of the field and line scanning coil 130 and is also horizontally deflected by the control signals E, and as a result, the scanning velocity of the electron beam on the screen 113 is modulated by the deflection of the control signal E, when the signal $Y_1$ rises and falls. That is, the scanning velocity becomes higher immediately before the signal $Y_1$ rises, then becomes lower during the course of rising of the signal $Y_1$, and returns to its normal velocity after the signal $Y_1$ has risen completely. This scanning velocity becomes lower immediately before the signal $Y_1$ falls, then becomes higher while the signal $Y_1$ is falling, and returns to its normal velocity after the signal $Y_1$ has fallen completely. As a result, the amount of light emitted from the screen 113 is suppressed at that portion of the screen 113 at which the scanning velocity becomes higher and is increased at that portion of the screen 113 at which the scanning velocity becomes lower. That is, the modulation of the scanning velocity causes the amount of light emitted from those portions of the screen 113 which correspond to the rise and fall of the signal $Y_1$ to change suddenly, thereby improving the sharpness of picture images produced on the screen 113.

As stated hereinbefore, the cathode ray tube according to the invention makes it possible to supply the control signal E for modulating the scanning velocity to converging deflection means 105 consisting of the electrostatic deflecting plates $105O_1$, $105I_1$, $105I_2$ and $105O_2$, so that the voltage level of the control signal E supplied to each deflecting plate may be chosen such that the scanning velocity of each beam on the screen 113 is uniformly modulated. In addition, the modulation of the beam scanning velocity prevents misconvergence of the beams and permits a correct and excellent operation to correct the position of beams in response to undisirous durations of the beams. Moreover, a very important feature of this structure is that the absence of an independent deflection means for modulation the scanning velocity makes the neck portion 100N shorter in length and simple in construction. In addition, the use of the inner and outer walls of the neck portion 100N as the dielectric and mechanical support of the condenser means for supplying the control signal for modulating the scanning velocity, and the arrangement of the resistance means which cooperates with the condenser in the neck portion 100N simplifies the construction of the cathode ray tube and, especially, the construction of the terminals.

The invention is capable of supplying the control signal from a space which is separated from the envelope of the cathode ray tube by the least possible distance from the beam deflection means, thereby decreasing the effect of stray capacity on the control signal. This prevents the loss of the high frequency component of the control signal and the concommitant loss of fidelity of the signal, which have been encountered in prior structures.

The invention is not limited to the above described construction and arrangement of the image reproducing device and parts thereof, but many modifications and alterations may be made without departing from the spirit of the invention.

What is claimed is:

1. A color video signal reproducing device comprising:

a color cathode ray tube including a color phosphor screen having arrays of phosphor areas for emitting different colors and which are arranged in groups;

an electron gun in said tube including beam producing means directing a plurality of electron beams from laterally spaced apart points of origin toward said screen for impingement on respective phosphor areas of the latter, main electron lens means disposed between said beam producing means and said screen for focusing said electron beams at said screen, means converging said beams from said points of origin for causing said beams to intersect each other at a location substantially centered within said main electron lens means and to exit from the latter along divergent paths, and convergence deflecting means arraged along said divergent paths for reconverging said electron beams to impinge on respective phosphors of one of said groups thereof;

deflection yoke means on said tube between said convergence deflecting means and said screen for causing said electron beams to scan said screen in line-scanning and vertical directions, respectively;

a pair of deflection plates spaced apart in said line-scanning direction and being disposed immediately adjacent said main electron lens means between the latter and said convergence deflecting means so that the beams exiting from said main electron lens means pass between said pair of deflection plates at portions of said divergent paths that are relatively close to each other; and circuit means for applying across said pair of deflection plates a control signal which varies the scanning speed of said beams in the line-scanning direction in response to transient changes in the brightness of the video signal being reproduced.

2. A color video signal reproducing device according to claim 1; in which said points of origin of the electron beams lie in a common plane which is parallel to said line-scanning direction.

* * * * *